United States Patent
Kamiya

(10) Patent No.: US 8,427,553 B2
(45) Date of Patent: Apr. 23, 2013

(54) VIDEO SIGNAL PROCESSING APPARATUS AND VIDEO SIGNAL PROCESSING METHOD

(75) Inventor: Koji Kamiya, Kanagawa (JP)

(73) Assignee: Sony Corporation, Tokyo (JP)

( * ) Notice: Subject to any disclaimer, the term of this patent is extended or adjusted under 35 U.S.C. 154(b) by 191 days.

(21) Appl. No.: 12/976,201

(22) Filed: Dec. 22, 2010

(65) Prior Publication Data

US 2011/0157428 A1    Jun. 30, 2011

(30) Foreign Application Priority Data

Dec. 28, 2009   (JP) .............................. P2009-297929

(51) Int. Cl.
*H04N 13/00*   (2006.01)
*H04N 5/228*   (2006.01)
*H04N 5/262*   (2006.01)

(52) U.S. Cl.
USPC .......................... 348/239; 348/42; 348/222.1

(58) Field of Classification Search .............. 348/42–51, 348/207.99, 221.1, 239
See application file for complete search history.

(56) References Cited

U.S. PATENT DOCUMENTS

| | | | | |
|---|---|---|---|---|
| 5,119,189 A  * | 6/1992 | Iwamoto et al. | ................. | 348/47 |
| 5,714,997 A  * | 2/1998 | Anderson | ........................ | 348/39 |
| 5,786,847 A  * | 7/1998 | Katayama et al. | ............... | 348/47 |
| 6,762,794 B1 * | 7/2004 | Ogino | ........................... | 348/262 |
| 7,596,286 B2 * | 9/2009 | Nose et al. | .................... | 382/300 |
| 2008/0131107 A1* | 6/2008 | Ueno | ............................... | 396/50 |
| 2008/0239064 A1* | 10/2008 | Iwasaki | .......................... | 348/47 |
| 2011/0069151 A1* | 3/2011 | Orimoto | ......................... | 348/42 |
| 2012/0019623 A1* | 1/2012 | Kokuwa et al. | ................. | 348/47 |
| 2012/0038753 A1* | 2/2012 | Hoshino | ......................... | 348/51 |

FOREIGN PATENT DOCUMENTS

JP    2002 77947    3/2002

* cited by examiner

*Primary Examiner* — Sinh Tran
*Assistant Examiner* — Selam Gebriel
(74) *Attorney, Agent, or Firm* — Frommer Lawrence & Haug LLP; William S. Frommer

(57) ABSTRACT

Disclosed herein is a video signal processing apparatus including an image outputting portion, a manipulation portion, and a video signal extracting portion.

6 Claims, 15 Drawing Sheets

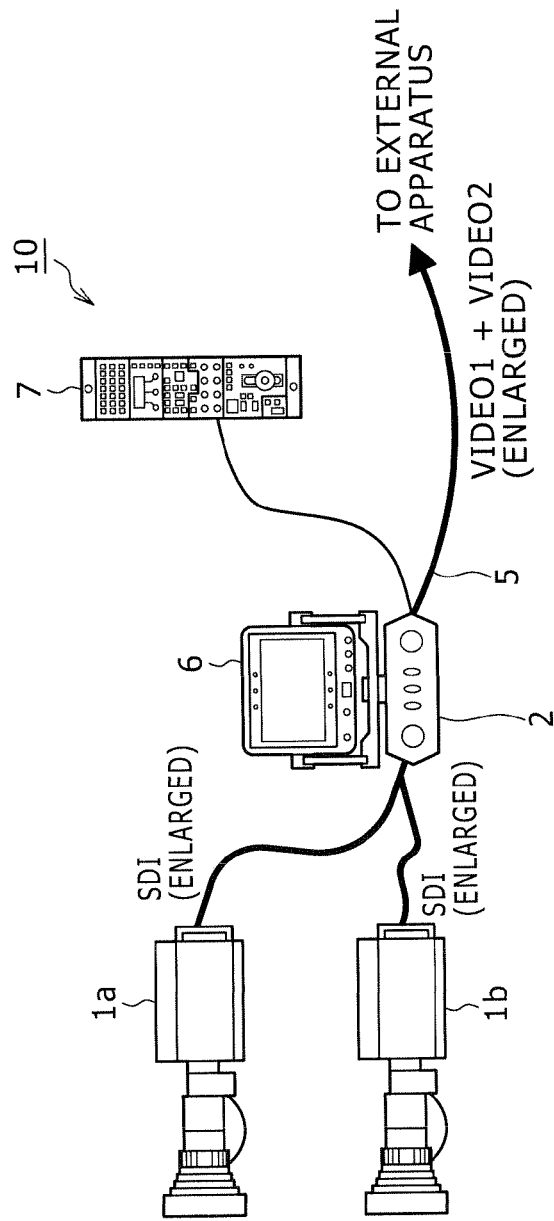

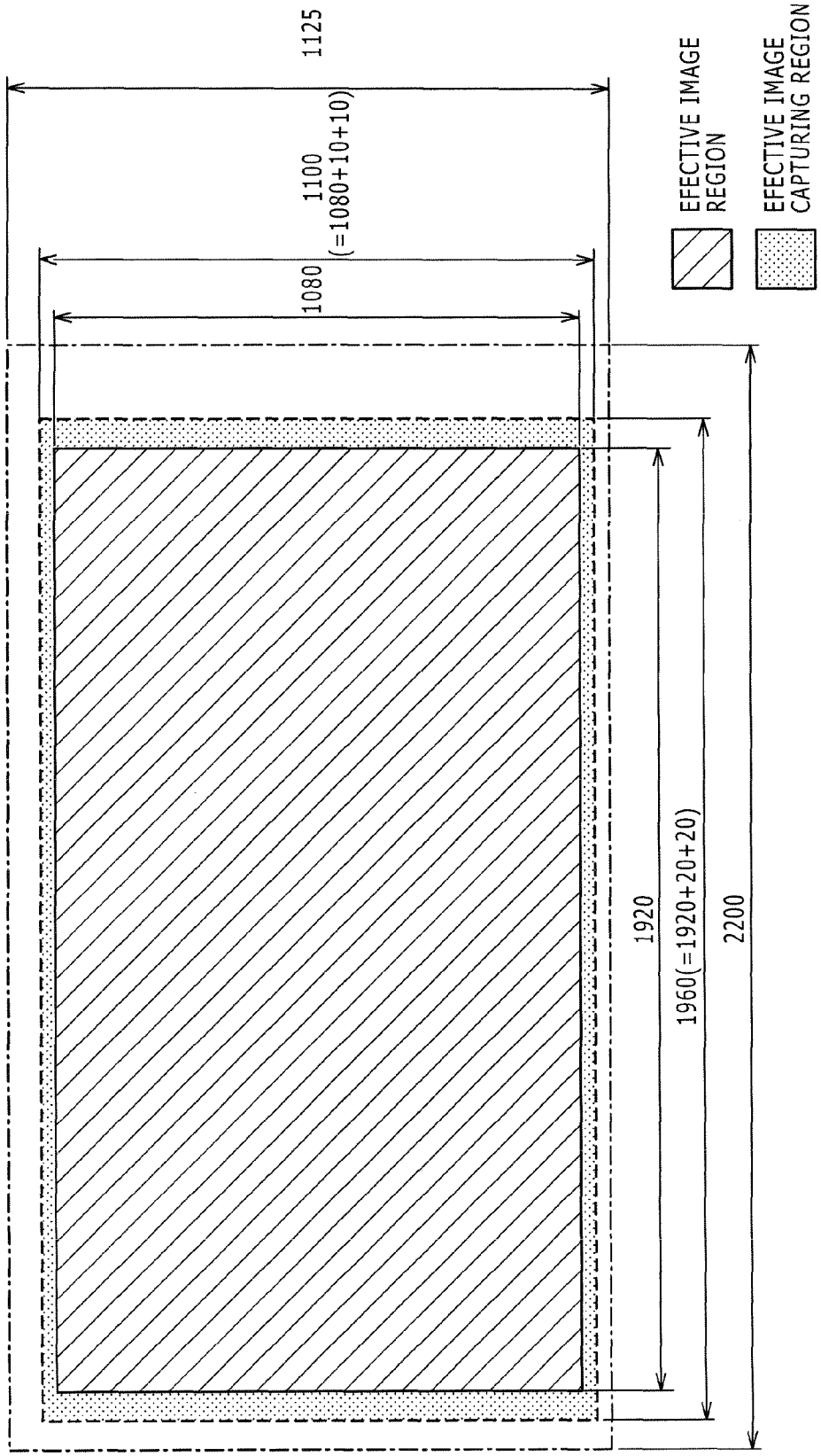

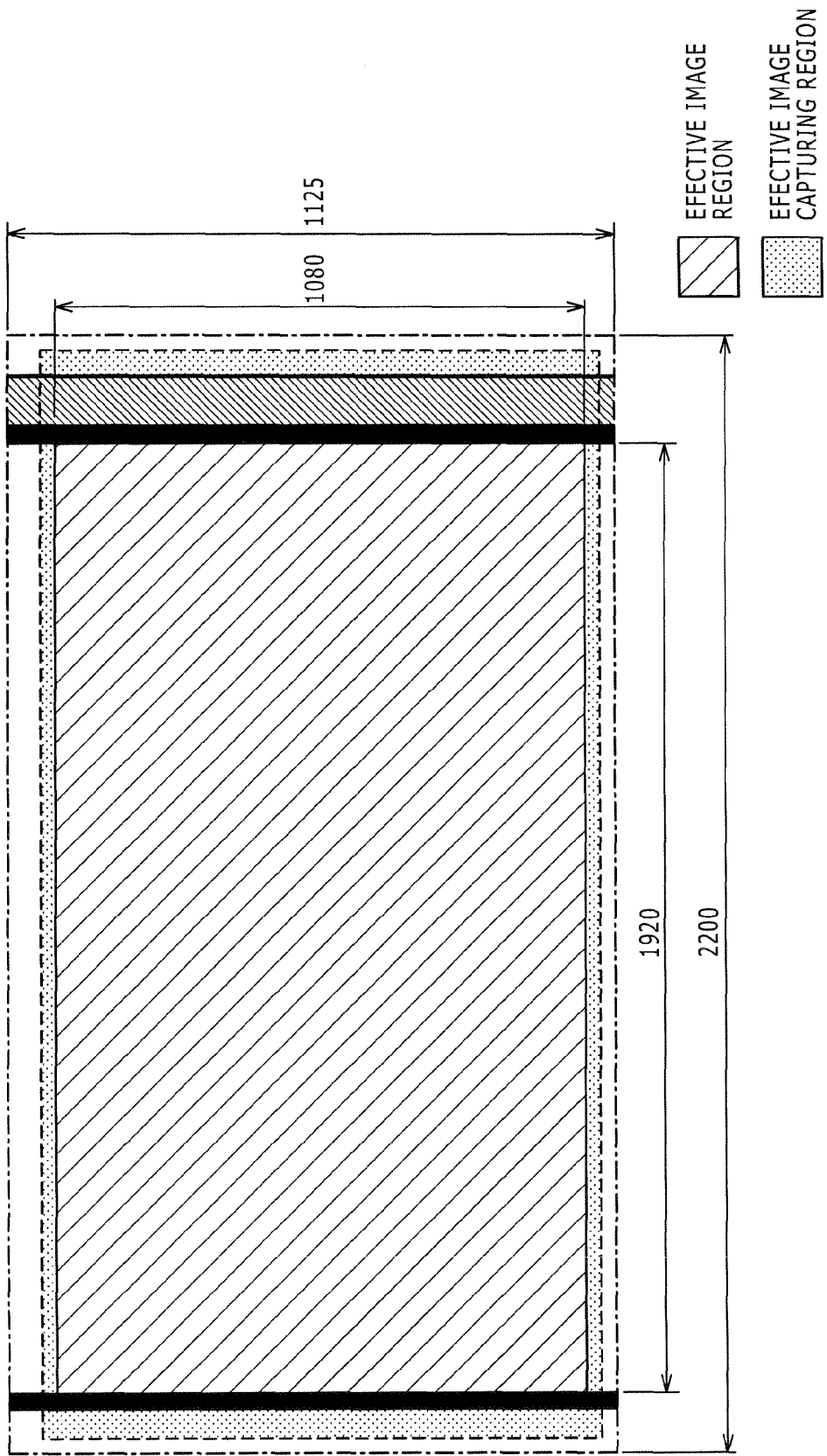

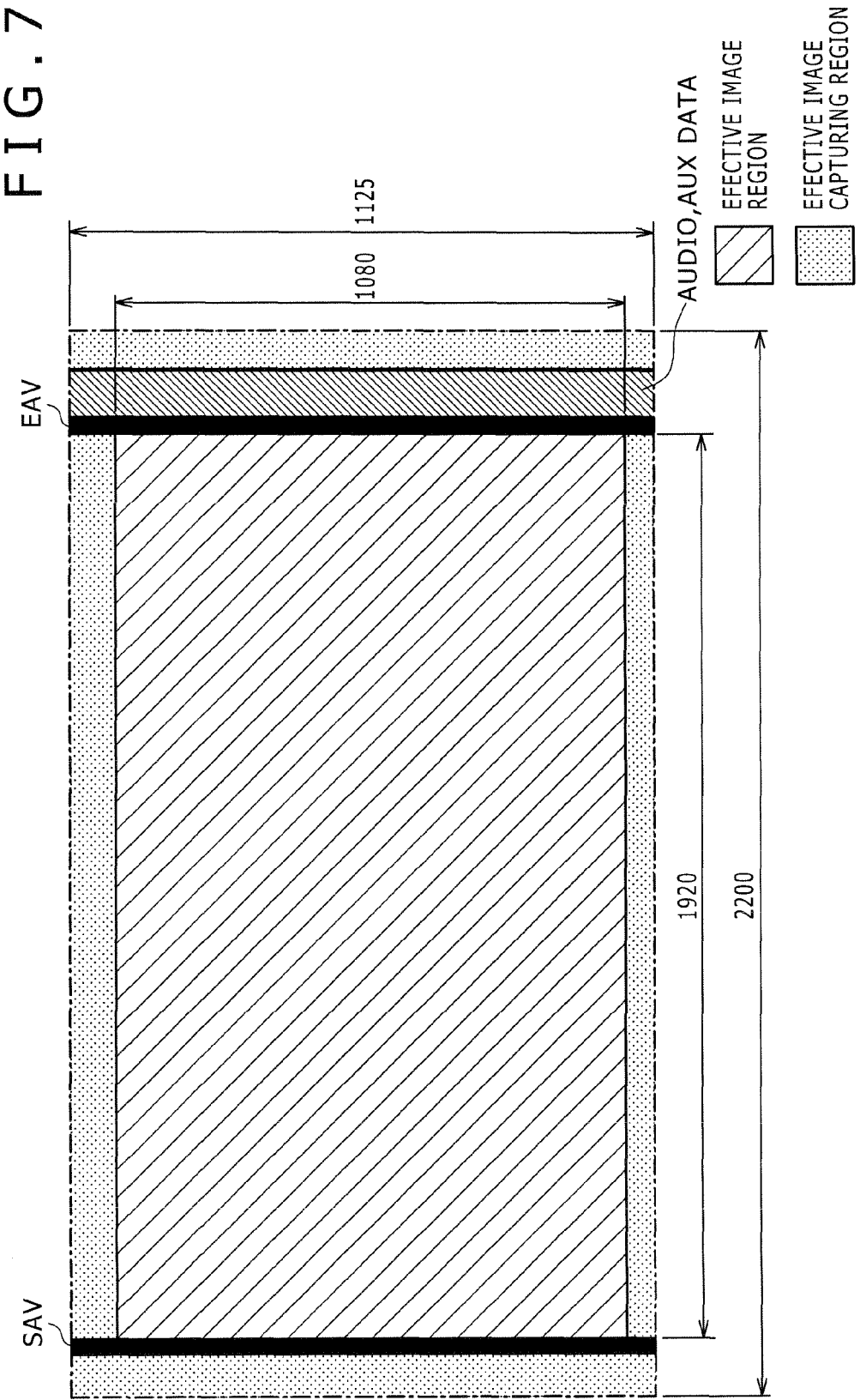

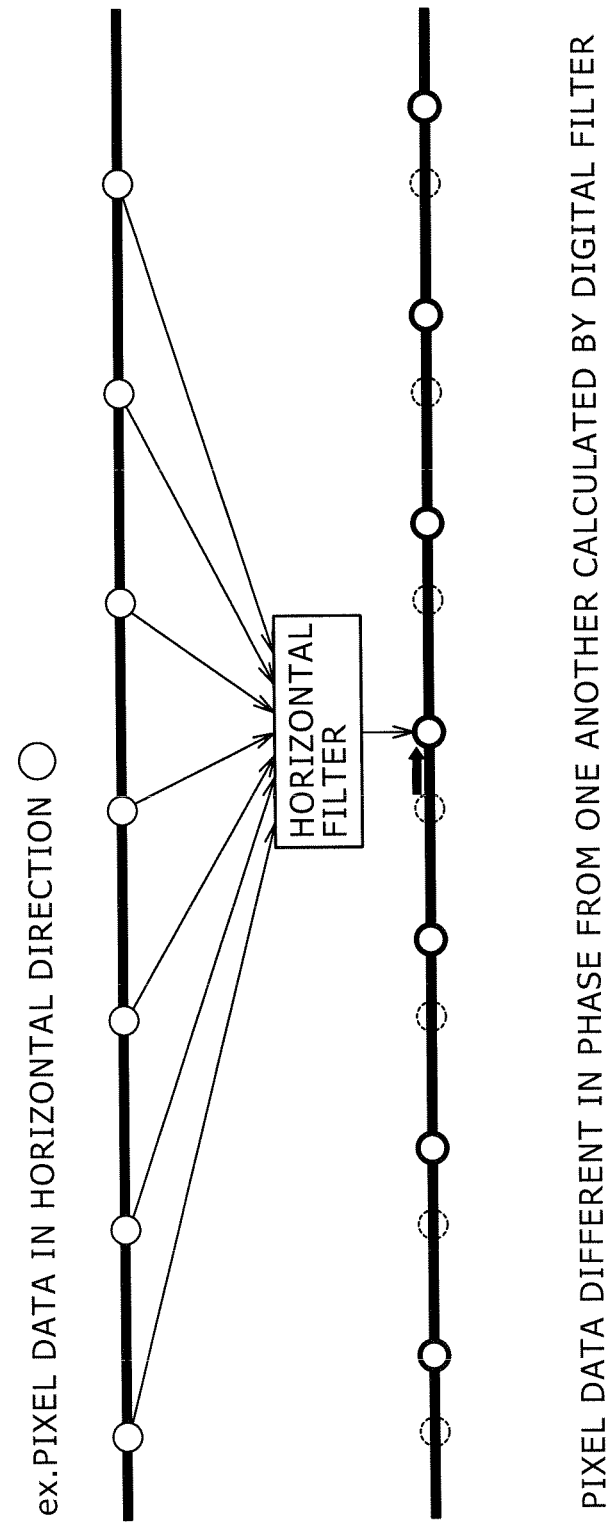

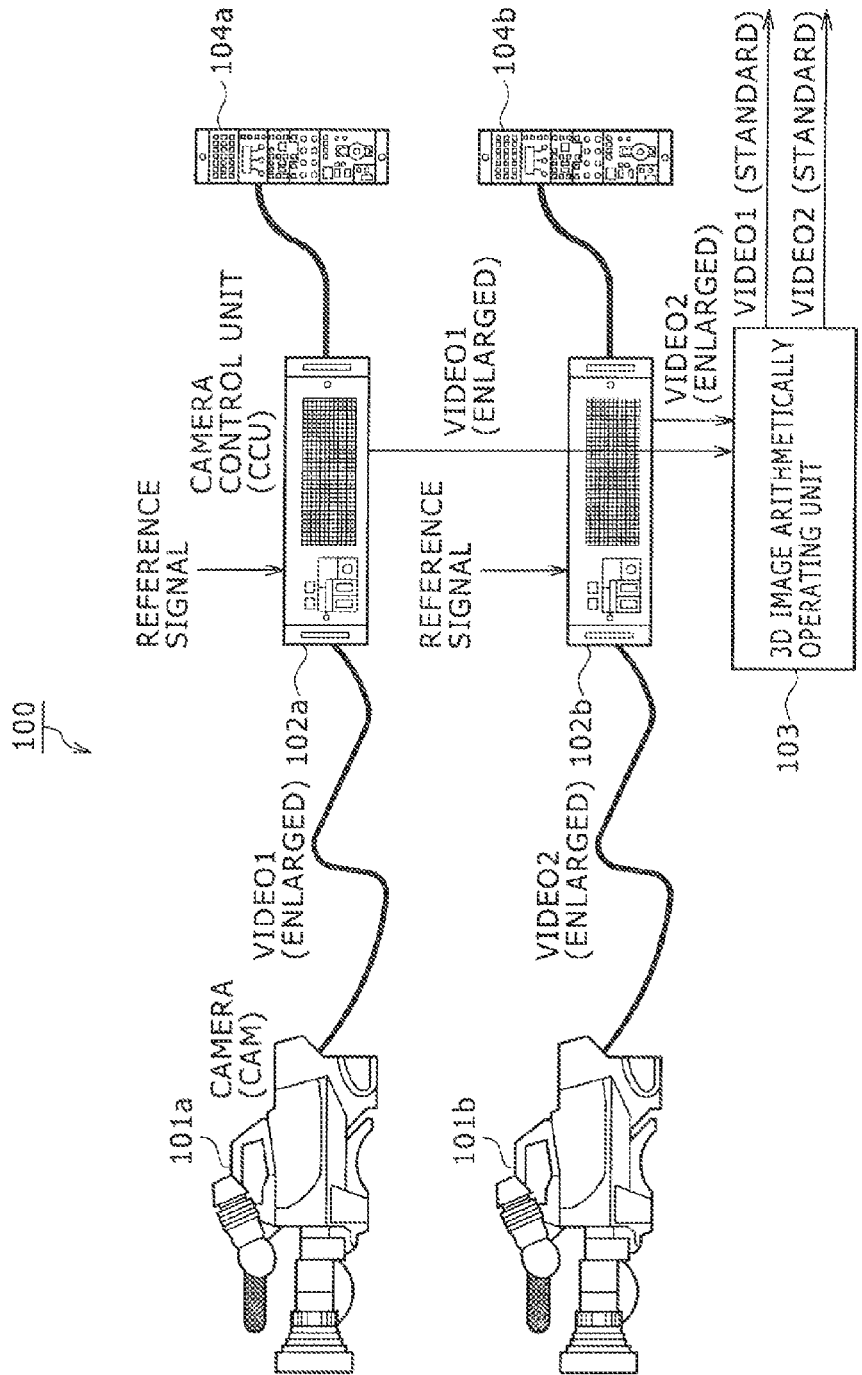

VIDEO SIGNAL PROCESSING APPARATUS AND VIDEO SIGNAL PROCESSING METHOD

BACKGROUND OF THE INVENTION

1. Field of the Invention

The present invention relates to a video signal processing apparatus and video signal processing method each of which, for example, is suitable for being applied to the case where a three-dimensional (3D) image is generated from images captured by using two cameras.

2. Description of the Related Art

Heretofore, a 3D camera system for compounding images captured by using two cameras, thereby obtaining a three-dimensional image has been used. The 3D camera system uses a system in which two cameras are installed in a Rig having a mechanical fine adjustment function, and images captured by using the two cameras, respectively, are compounded so as to correspond to optical axes of the two cameras. In addition, a system is known in which an image for which a shift between optical axes is cut out from the photographed material to be enlarged into an original video signal format as post-processing.

FIG. 15 shows an example of a configuration of an existing 3D camera system 100.

The 3D camera system 100 includes two cameras 101a and 101b, camera control units 102a and 102b, a 3D image arithmetically operating unit 103, and control panels 104a and 104b. In this case, the camera control units 102a and 102b control operations of the cameras 101a and 101b, respectively. The 3D image arithmetically operating unit 103 arithmetically operates a 3D image from two sheets of images. Also, the control panels 104a and 104b control operations of the cameras 101a and 101b, respectively. A reference signal is directly inputted to each of the camera control units 102a and 102b. Thus, the cameras 101a and 101b directly output data on captured images not only to the camera control units 102a and 102b, but also to an external apparatus through the 3D image arithmetically operating unit 103.

A technique for adjusting a position shift and a rotation shift, between images, which are generated in two or more images having a parallax, thereby obtaining a three-dimensional image is disclosed in Japanese Patent Laid-Open No. 2002-77947.

SUMMARY OF THE INVENTION

Now, even when any of the system for compounding the optical axes or the system for enlargement into the original video signal format is used, time and money are lost in order to construct and configure the 3D camera system. In addition, when a part of the image is cut out to be enlarged, the original image having a high resolution at a time point when the images are photographed by using the cameras may not be effectively utilized, and thus only the image having a low resolution is obtained. However, if the shift between optical axes of the images is not corrected by using these systems, a quality of the 3D image is reduced. In addition, even when directions or heights of the two cameras are changed in order to correct the shift between the optical axes, the shift between the optical axes is easy to generate again due to a change in zoom, and thus the labor for compounding the images is not reduced.

The present invention has been made in order to solve the problems described above, and it is therefore desirable to provide a video signal processing apparatus and a video signal processing method each of which is capable of causing a work for correcting a shift between optical axes generated in images captured by using two cameras, thereby compounding images to be readily carried out.

In order to attain the desire described above, according to an embodiment of the present invention, there is provided a video signal processing apparatus including: an image outputting portion for outputting a standard video signal and an enlarged region video signal to a display portion for displaying thereon an image when first and second cameras each having an image pickup element including an effective image region for output of the standard video signal, and an enlarged region wider in horizontal and vertical directions than the effective image region, outputting the standard image signal from the effective image region, and outputting the enlarged region video signal from the enlarged region transmits the standard video signal in accordance with a predetermined transmission format with which the standard video signal and the enlarged region video signal are transmitted, and superimposes the enlarged region video signal on each of a vertical blanking interval and a horizontal blanking interval of the predetermined transmission format, thereby transmitting the resulting enlarged region video signal; a manipulation portion for outputting a manipulation signal in accordance with which a shift between optical axes of images captured by using the first and second cameras, respectively, is adjusted based on the image displayed on the display portion in accordance with the standard video signal; and a video signal extracting portion for moving a region of the standard video signal so as to correspond to the shift between the optical axes within a range of the enlarged region video signal when the shift between the optical axes is adjusted in accordance with the manipulation signal, extracting the standard video signal corresponding to a movement from the enlarged region video signal contained in a range of the movement, and outputting the standard video signal thus extracted.

According to another embodiment of the present invention, there is provided a video signal processing method, including the steps of: outputting a standard video signal and an enlarged region video signal to a display portion for displaying thereon an image when first and second cameras each having an image pickup element including an effective image region for output of the standard video signal, and an enlarged region wider in horizontal and vertical directions than the effective image region, outputting the standard image signal from the effective image region, and outputting the enlarged region video signal from the enlarged region transmits the standard video signal in accordance with a predetermined transmission format with which the standard video signal and the enlarged region video signal are transmitted, and superimposes the enlarged region video signal on each of a vertical blanking interval and a horizontal blanking interval of the predetermined transmission format, thereby transmitting the resulting enlarged region video signal; outputting a manipulation signal in accordance with which a shift between optical axes of images captured by using the first and second cameras, respectively, is adjusted based on the image displayed on the display portion in accordance with the standard video signal; and moving a region of the standard video signal so as to correspond to the shift between the optical axes within a range of the enlarged region video signal when the shift between the optical axes is adjusted in accordance with the manipulation signal, extracting the standard video signal corresponding to a movement from the enlarged region video signal contained in a range of the movement, and outputting the standard video signal thus extracted.

By adopting such a constitution, the optical axes of two sheets of images can be aligned with each other without reducing any of the resolutions of the images captured by using the cameras, respectively.

As set forth hereinabove, according to the present invention, each of the cameras transmits the video signal which is taken in each of the effective image region and the enlarged region, and the compounding of the shift between the optical axes can be carried out by using the video signal received. At this time, the shift between the optical axes in the effective image region is spread up to the enlarged region, thereby carrying out the compounding. For this reason, during the adjustment of the image, it is unnecessary to mechanically adjust each of the cameras. In addition, the image region in the imaging area is moved, thereby adjusting the image. Therefore, since the positions of the optical axes of the lenses can be aligned with each other by using the two cameras and thus the image is not enlarged, the resolutions of the image before and after the correction can be equalized.

BRIEF DESCRIPTION OF THE DRAWINGS

FIG. 1 is a schematic view showing an external construction and configuration of a camera system according to a first embodiment of the present invention;

FIG. 5 is an explanatory diagram showing an example of a pixel format in accordance with which a video signal of 1,920 samples×1,080 lines in the first embodiment of the present invention;

FIG. 6 is an explanatory diagram showing an example of a transmission format of a digital signal in the first embodiment of the present invention;

FIG. 7 is an explanatory diagram showing an example of a transmission format of a digital signal for which an image region is enlarged for transmission in the first embodiment of the present invention;

FIG. 9 is an explanatory diagram showing an example of an image which is displayed depending on presence or absence of a shift between optical axes in the first embodiment of the present invention;

FIG. 15 is a schematic view showing an example of an external construction and configuration of an existing camera system.

DETAILED DESCRIPTION OF THE PREFERRED EMBODIMENTS

Figure 2A:
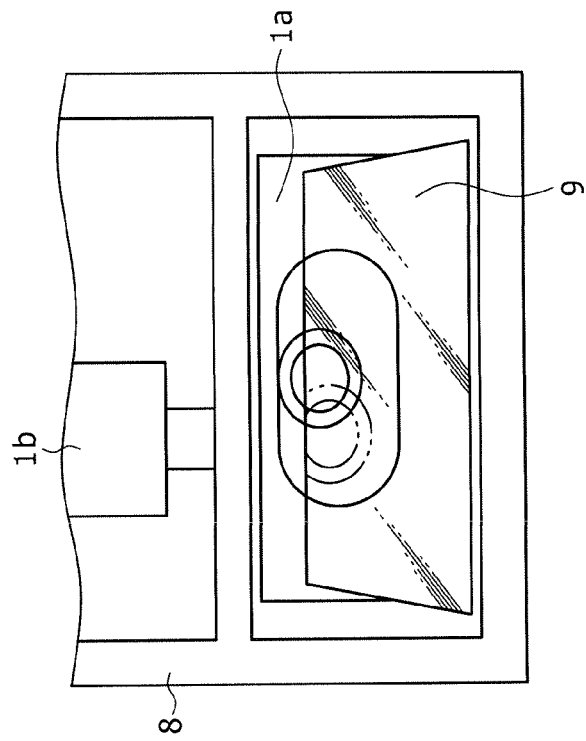
FIGS. 2A and 2B are respectively schematic views showing an installation stage (Rig) in which two cameras are installed in the first embodiment of the present invention.

The preferred embodiments of the present invention will be described in detail hereinafter with reference to the accompanying drawings. It is noted that the description will be given below in accordance with the following order.

1. First Embodiment (correction of a shift between optical axes of images: the case where a camera adaptor box and a camera head correct a shift between optical axes in conjunction with each other by using an image captured through an enlarged image region)

2. Second Embodiment (correction of a shift between optical axes of images: the case where a shift between optical axes is corrected by using an image captured through an enlarged image region by a camera control unit and a 3D image arithmetically operating unit)

3. Changes

4. Third Embodiment (a video signal processing method)

1. First Embodiment

Configuration of 3D Camera System

Hereinafter, a first embodiment of the present invention will be described with reference to FIG. 1 to FIGS. 11A to 11C. In the first embodiment, a description is given with respect to the case where the present invention is applied to a 3D camera system 10 including a Camera Adaptor Box (CAB) 2 which instructs two camera heads 1a and 1b to carry out an image capturing operation, and outputs data on images captured by using the camera heads 1a and 1b, respectively, to an external apparatus.

FIG. 1 shows a configuration of the 3D camera system 10.

The 3D camera system 10 includes the camera heads 1a and 1b, and a camera adaptor box 2. The camera adaptor box 2 includes a viewfinder portion 6 for displaying thereon images received from the camera heads 1a and 1b through viewfinder signals, respectively.

The camera adaptor box 2 and the external apparatus (not shown) are connected to each other through a camera cable 5. Also, the camera adaptor box 2 collects up video data on images inputted thereto from the camera heads 1a and 1b, respectively, and transmits the resulting video data to the external apparatus (not shown). A broadband digital optical transmission path which can transmit a large-capacity optical digital signal is used in the camera cable 5. In this case, the existing data rate is 1.5 Gbps, whereas the optical transmission at a data rate of 3.7 Gbps is supposed. However, it is also possible that the video data is compressed and the compressed video data is transmitted in a narrowband (as in the past).

The camera adaptor box 2 executes processing for reversing the images inputted thereto from the camera heads 1a and 1b, or carrying out delay for making output signals in phase with each other as may be necessary. Also, an operation of the camera adaptor box 2 is controlled by using a control panel 7 manipulated by an engineer.

Figure 2B:
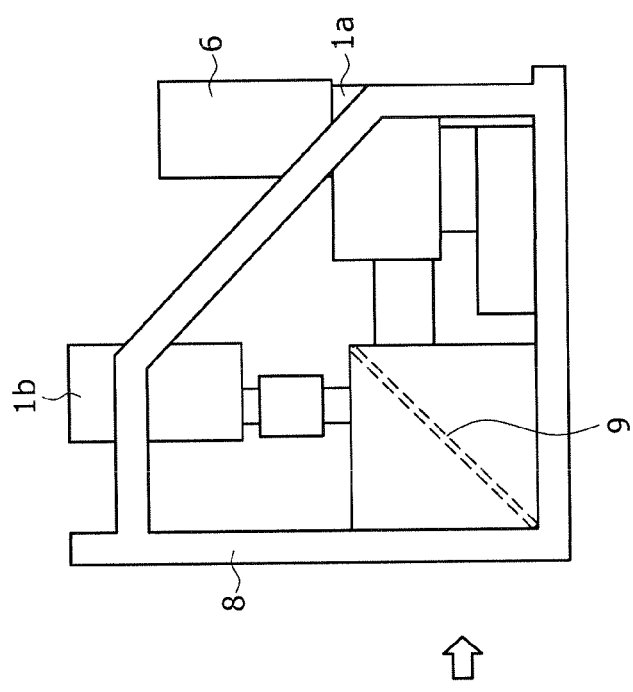

FIGS. 2A and 2B show a construction of an installation stage (RIG) 8 in which the camera heads 1a and 1b are both installed.

FIG. 2A shows constructions of the camera heads 1a and 1b when the Rig 8 is visibly recognized from a transverse direction.

Basically, it is known that a three-dimensional image obtained from images captured when a zoom of each of the camera heads 1a and 1b is set as one magnification, and the camera heads 1a and 1b are disposed in such a way that an interval of the lenses corresponds to the eyes of the human being naturally appears. However, since chassis of the camera heads 1a and 1b are each large in size, if these chassis are transversely arranged as they are, images of a subject are captured with a parallax wider than that of the human being. As a result, a feeling of strangeness is brought in a three-dimensional image. For this reason, the Rig 8 is provided with a half mirror 9. Also, the camera head 1a is disposed in a position to which an image light of the subject is transmitted through the half mirror 9 to be made directly incident. Also, the camera head 1b is disposed in a position to which the image light of the subject is reflected by the half mirror 9 to be made incident. As a result, the camera heads 1a and 1b are installed so that optical axes of the lenses with which the camera heads 1a and 1b are provided, respectively, intersect vertically with each other.

FIG. 2B shows an example of visibility of the half mirror 9 when visibly recognized from a direction indicated by an arrow of FIG. 2A.

The camera heads 1a and 1b are transversely shifted at a width obtained from the parallax of the human being to be installed in the Rig 8. For this reason, FIG. 2B shows that the lens, of the camera head 1a, on which the image light of the subject is transmitted through the half mirror 9 to be reflected, and the lens, of the camera head 1b, on which the image light of the subject is reflected by the half mirror 9 to be reflected are transversely shifted. The half mirror 9 is provided with the Rig 8 in such a manner, whereby the camera heads 1a and 1b can be installed so as to correspond to the parallax of the human being. As a result, no feeling of strangeness is brought in the resulting three-dimensional image.

Figure 3:
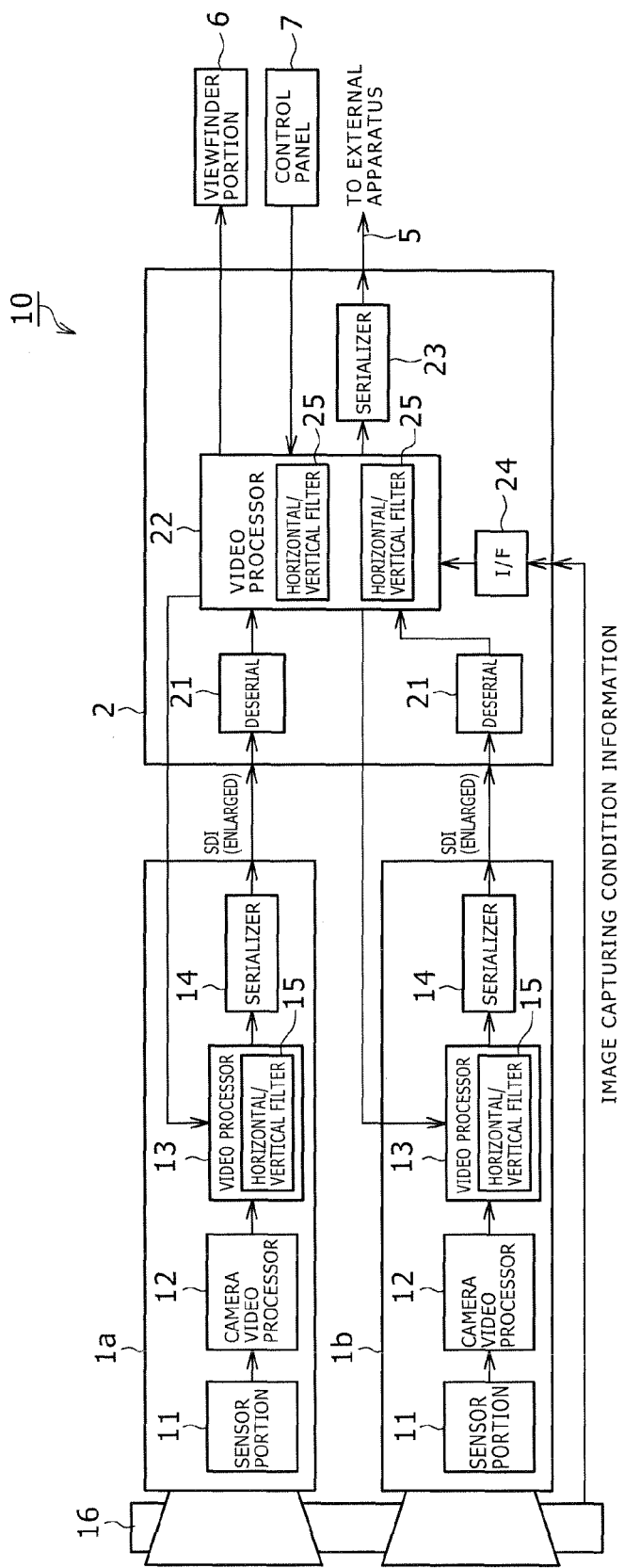
FIG. 3 is a block diagram showing an internal configuration of the camera system according to the first embodiment of the present invention.

FIG. 3 shows an internal configuration of the 3D camera system 10.

The camera head 1a is provided with a sensor portion 11 for outputting a video signal. The sensor portion 11 is composed of an image pickup element such as a Charge Coupled Devices (CCD) imager or a Complementary Metal Oxide Semiconductor (CMOS) sensor. This image pickup element includes an effective image region which outputs a standard video signal, and an enlarged region which is wider in horizontal and vertical directions than the effective image region. Also, the image pickup element outputs a standard video signal from the effective image region, and outputs an enlarged region video signal from the enlarged region.

In addition, the camera head 1a includes a camera video processor 12 and a video processor 13. In this case, the camera video processor 12 subjects the video signal outputted from the sensor portion 11 to predetermined processing, thereby outputting a video signal after completion of the predetermined processing to the camera adaptor box 2. Also, the video processor 13 enlarges a transmission region and superimposes the video signal on the enlarged region. The video processor 13 includes a horizontal/vertical filter 15 for subjecting the video signal inputted thereto filter processing horizontally and vertically. In addition, the camera head 1a includes a serializer 14 for converting a parallel video signal outputted from the video processor 13 into a serial video camera, and outputting the resulting serial video signal. The video signal transmitted between the camera head 1a and the camera adaptor box 2 is superimposed on each of the effective image region and the enlarged region in accordance with an SDI transmission format.

It is noted that since the camera head 1b has the same configuration as that of the camera head 1a, the processing blocks corresponding to those in the camera head 1a are designated by the same reference blocks, respectively, and a detailed description thereof is omitted here for the sake of simplicity.

The camera heads 1a and 1b include an image capturing condition information outputting portion 16. In this case, the image capturing condition information outputting portion 16 sends image capturing condition information set in each of the camera heads 1a and 1b when an image of a subject is captured to a video processor 22 through a status interface portion 24 which will be described later. A lens status, and information on an inclination or the like of the Rig 8 are contained in the image capturing condition information. The image capturing condition information is also sent from the video processor 22 to the video processors 13 which the camera heads 1a and 1b include, respectively.

The camera adaptor box 2 includes two deserials 21, a video processor 22, and serializer 23. In this case, the two deserials 21 convert serial video signals inputted thereto from the camera heads 1a and 1b into parallel video signals, respectively. The video processor 22 aligns the optical axes of the images in accordance with the parallel video signal of the camera heads 1a and 1b inputted from the deserial 21. Also, the serializer 23 converts the video signal for which the alignment of the optical axes was carried out into a serial video signal, thereby outputting the resulting serial video signal. In addition, the camera adaptor box 2 includes a status interface portion 24 for receiving the image capturing condition information from the image capturing condition information outputting portion 16. Thus, the horizontal/vertical filter 25 (or the horizontal/vertical filter 15) extracts a standard video signal in accordance with the image capturing condition information inputted thereto through the status interface portion 24.

Next, operations of the portions of the 3D camera system 10 will be described in detail.

The camera head 1a, 1b transmits the standard video signal to the camera adaptor box 2 in accordance with a predetermined transmission format with which both the standard video signal and the enlarged region video signal are transmitted, and superimposes the enlarged region video signal on each of a vertical blanking interval and a horizontal blanking interval of the predetermined transmission format, thereby transmitting the resulting video signal. The processing for superimposing each of the standard video signal and the enlarged region video signal on the predetermined transmission format is executed by the camera video processor 12. Also, either the video processor 13 or the video processor 22 functions as an image outputting portion for outputting the standard video signal and the enlarged region signal to the viewfinder portion 6.

Also, the horizontal/vertical filter 15, 25 adjusts a shift between optical axes of two sheets of images in accordance with a manipulation signal received from the control panel 7. At this time, the horizontal/vertical filter 15, 25 functions as a video signal extracting portion. In this case, the video signal extracting portion moves the region of the standard video signal so as to correspond to the shift between the optical axes within the range of the enlarged region video signal, extracts the standard video signal in a desired range from the enlarged region video signal contained in the range for the movement amount, and outputs the standard video signal thus extracted.

Also, the horizontal/vertical filter 15, 25 has a function of cutting out the enlarged region video signal contained in the vertical direction, in the horizontal direction or in the rotational direction with respect to the effective video region, thereby extracting the standard video signal.

Here, when the horizontal/vertical filter 15 of the video processor 13 with which the camera head 1a, 1b is provided carries out the adjustment for the shift between the optical axes, the horizontal/vertical filter 25 with which the video processor 22 is provided is bypassed. On the other hand, when the horizontal/vertical filter 25 with which the video processor 22 is provided carries out the adjustment for the shift between the optical axes, the horizontal/vertical filter 15 of the video processor 13 with which the camera head 1a, 1b is provided is bypassed. As has been described, the horizontal/vertical filters 15 and 25 have a relationship in which when one of the horizontal/vertical filters 15 and 25 carries out the filtering operation, the other bypasses the processing. In addition, the horizontal/vertical filter 15, 25 has an offset function of filtering the video signal in the horizontal and vertical directions, thereby converting a sample phase in pixel units or less.

The video signal outputted from the camera head 1a, 1b is converted into the serial video signal through the video processor 13 and the serializer 14, thereby being inputted to the camera adaptor box 2. Here, the horizontal/vertical filter 15 with which the video processor 13 is provided subjects the parallel video signal inputted thereto to horizontal/vertical filtering, and converts the resulting video signal having an arbitrary phase into the serial video signal through the serializer 14, thereby outputting the resulting serial video signal.

The camera adaptor box 2 converts the serial video signal received from the camera head 1a, 1b into the parallel video signal through the deserial 21. The video processor 22 outputs the parallel video signal to the viewfinder portion 6. Also, the viewfinder portion 6 displays thereon the images captured by using the camera heads 1a and 1b, respectively. The engineer manipulates the control panel 7 while he/she sees the images displayed on the viewfinder 6, thereby carrying out the alignment for the optical axes of the images. At this time, the control panel 7 outputs a manipulation signal in accordance with which the shift between the optical axes of the images captured by using the camera heads 1a and 1b, respectively, is adjusted based on the images which are displayed on the viewfinder portion 6 in accordance with the standard video signals outputted from the camera heads 1a and 1b, respectively.

In addition, the image capturing condition information is inputted from each of the camera heads 1a and 1b to the video processor 22 through the status interface portion 24. Therefore, the engineer can know under what kind of condition the camera heads 1a and 1b capture the images of the subject, respectively. Also, the video processor 22 converts the data on the images for which the alignment between the optical axes was carried out into the serial video signal through the serializer 23, and outputs the resulting serial video signal to the external apparatus. It is noted that while the alignment between the optical axes is carried out, the inclinations, the horizontal positions and the like of the images being displayed on the viewfinder portion 6 are suitably changed. In addition, since as will be described later, various kinds of images (such as a difference image) are displayed on the viewfinder portion 6, the engineer can readily carry out the alignment between the optical axes of two sheets of images.

As has been described, an instruction in accordance with which the control panel 7 carries out the alignment between the optical axes of the images can also be directly issued to the video processor 13 with which the camera head 1a, 1b is provided. In this case, the phase of the video signal inputted from the camera video processor 12 is changed by the horizontal/vertical filter 15 with which the video processor 13 is provided. Also, the video signal having the changed phase is inputted to the camera adaptor box 2, and the viewfinder portion 6 displays thereon the images for which the camera heads 1a and 1b have carried out the alignment between the optical axes of the images.

The camera head 1a, 1b and the camera adaptor box 2 are provided with the horizontal/vertical filters 15 and 25, respectively. Therefore, the video data having the wide effective image region decided in the sensor portion 11 can be reconstructed while the resolution of the video signal received from the sensor portion 11 is maintained. Also, the video processor 13, 22 cuts out the effective image region of the signal format with the image centers being shifted, thereby making it possible to correct the shift between the optical axes of the two sheets of images.

In addition, when as shown in FIG. 2, the construction of the Rig 8 uses the Rig system requiring the image reverse, both the image capturing timing and the image output timing of the camera head 1a, 1b need to be made to agree with each other. For this reason, the camera adaptor box 2 has not only an image reversing function, but also an image delaying function. However, any of the camera head 1a, 1b or the camera adaptor box 2 may have not only the image reversing function, but also the image delaying function.

In addition, when the sensor portion 11 uses a line-scanning image capturing (the CCD imager uses an image surface scanning system) as with the CMOS sensor, a function of changing the vertical order for scanning when the image is vertically reversed is installed in the camera head 1a, 1b. For this reason, the camera adaptor box 2 can align the directions of image distortions due to a rolling shutter effect.

At this time, the video processor 22 causes the image received from one of the camera heads 1a and 1b to correspond to the image received from the other of the camera heads 1a and 1b, and under this state, carries out the vertical reverse for the image, thereby outputting the data on the resulting image. Also, the video processor 22 delays the image capturing timing for one picture with respect to the other camera, thereby outputting an image capturing timing signal.

Figure 4A:
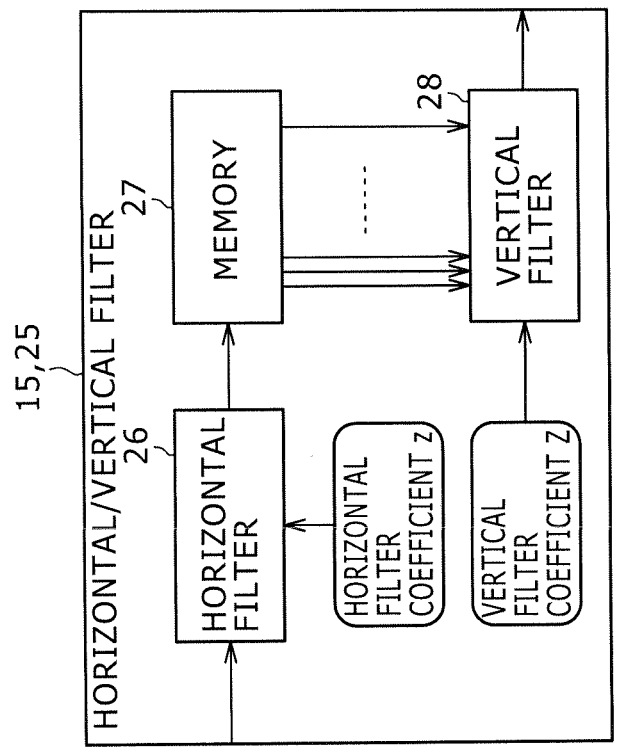
FIGS. 4A and 4B are respectively block diagrams each showing an internal configuration of a video processor in the first embodiment of the present invention.
Figure 4B:
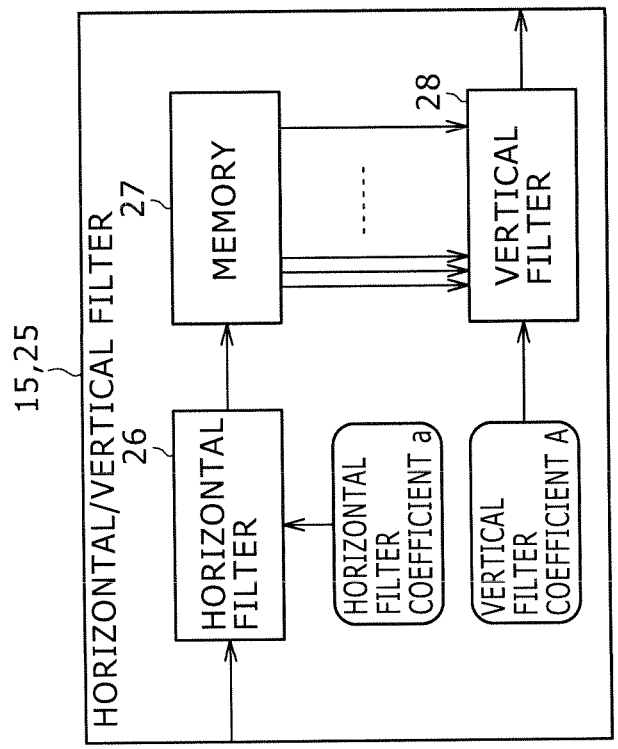

FIGS. 4A and 4B show respectively internal configurations of the horizontal/vertical filter 15, 25.

FIG. 4A shows an operation of the horizontal/vertical filter 15, 25 when a horizontal filter coefficient is taken to be a, and a vertical filter coefficient is taken to be A.

The horizontal/vertical filters 15 and 25 include the horizontal/vertical filters 15 and 25, respectively. Here, the horizontal/vertical filter 15, 25 is composed of a horizontal filter 26, a memory 27, and a vertical filter 28.

The horizontal filter coefficient a is inputted to the horizontal filter 26. Thus, with the horizontal filter 26, the video signal inputted thereto is subjected to horizontal filtering, and is then written to the memory 27. Also, the vertical filter coefficient A is inputted to the vertical filter 28. Thus, the video signal read out from the memory 27 is subjected to vertical filtering, and is then outputted.

Here, the horizontal/vertical filter 15, 25 can change a sample phase of the video signal inputted thereto. Making a consideration in terms of an analog image, this corresponds to the case where a group delay is given in the filter processing. Also, processing which is executed by the horizontal/vertical filter 15, 25 becomes filter processing for giving a phase change equal to or smaller than a clock unit.

Specifically, the horizontal/vertical filter 15, 25 carries out multi-oversampling, and extracts only the data corresponding to a necessary sample phase therefrom. For this reason, the position of the sample phase can be adjusted with one dot or less.

Actually, the horizontal/vertical filter 15, 25 extracts no oversampling processing, but directly calculates a dot position of the sample phase shifted from the sample phase based on filter calculation.

Here, a description will now be given with respect to the processing for cutting out the video signal which was executed by an existing camera adaptor box.

The existing camera adaptor box changes a coefficient of a filter, thereby giving a received video signal an arbitrary phase. However, the existing camera adaptor box receives only a video signal outputted from a regular effective image region of a camera head. For this reason, the video processor 13, 22 carried out the correction for the shift between the optical axes within the range of the effective image region.

In order to cut out the image region, for example, the following methods are used.

The image is enlarged and is then cut out.

The corner image is gradated.

The cutting-out is carried out so as to correspond to a portion having no image.

Here, when either the video processor 13 with which the camera head 1a, 1b in the first embodiment is provided, or the video processor 22 with which the camera adaptor box 2 is provided is used, it is possible to flexibly set the adjustment range of the effective image region. However, when the standard video signal and the enlarged region video signal are superimposed on the effective image region and the enlarged region, respectively, to each of which the sensor portion 11 and the camera video processor 12 input the video signal, and are then outputted, the video processor 13, 22 aligns the optical axes of the images without enlarging the image and carrying out the cutting-out. For this reason, if the correction is carried out beyond the enlarged region, the corners of the image are cut. In this case, for example, there is executed processing for exerting no influence on the visibility by gradating the corner images.

FIG. 4B shows an operation of the horizontal/vertical filter 15, 25 when a horizontal filter coefficient is taken to be z, and a vertical filter coefficient is taken to be Z.

The horizontal/vertical filter 15, 25 shown in FIG. 4B is identical in configuration to the horizontal/vertical filter 15, 25 shown in FIG. 4A except that the filter coefficients z and Z are different from the filter coefficients a and A.

The horizontal filter coefficient z is inputted to the horizontal filter 26. Thus, with the horizontal filter 26, the video signal outputted thereto is subjected to horizontal filtering, and is then written to the memory 27. Also, the vertical filter coefficient Z is inputted to the vertical filter 28. Thus, the video signal read out from the memory 27 is subjected to vertical filtering, and is then outputted.

FIG. 5 shows an example of a pixel format in accordance with which a video signal of 1,920 samples×1,080 lines is regulated.

With regard to the pixel format for the video signal outputted from the sensor portion 11 and the camera video processor 12, the existing region in which the video signal of 1,920 samples×1,080 lines is contained is set as the effective image region. Also, the region obtained by enlarging the size of the effective image region by several samples is set as the enlarged region. In this example, the size of the enlarged region is set as 1,960 samples×1,100 lines. In a word, the horizontal size of the enlarged region is obtained by enlarging each of a right-hand side and a left-hand side of the effective image region by 20 samples. Also, the vertical size of the enlarged region is obtained by enlarging each of an upper side and a lower side of the effective image region by 10 lines.

FIG. 6 shows an example of a transmission format in accordance with which the video signal is transmitted.

A region for transmission of the video signal of 1,920 samples×1,080 lines in the effective image region is provided in this transmission format. Also, a region for transmission of the video signal in the enlarged region is provided in the circumference of the effective image region.

FIG. 7 shows an example of a transmission format of the digital signal.

An SDI format, for example, is used as the transmission format of the digital signal. A region for transmission of the video signal of 1,920 samples×1,080 lines, and a region for transmission of a timing reference code (such as SAV or EVA), audio data, and AUX data are provided in the transmission format. In this case, the latter region is provided both on a right-hand side and a left-hand side of the former region. When the camera head 1a, 1b outputs the digital video signal, no blanking is applied to a V blanking interval. On the other hand, the data in an H blanking interval is transmitted in a state of being superimposed on a subsidiary data region so as to crush none of the timing reference code (such as SAV or EAV) and the audio data. In this example, a video signal corresponding to a difference between the enlarged regions is superimposed on the subsidiary data region painted with gray in FIG. 7, and is then transmitted.

Figure 8B:
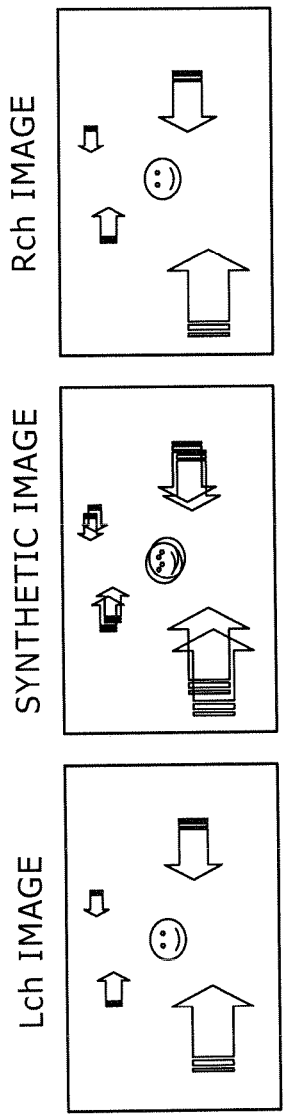
FIGS. 8A, 8B and 8C are respectively explanatory views showing an example of pixel interpolation in the first embodiment of the present invention.
Figure 8C:
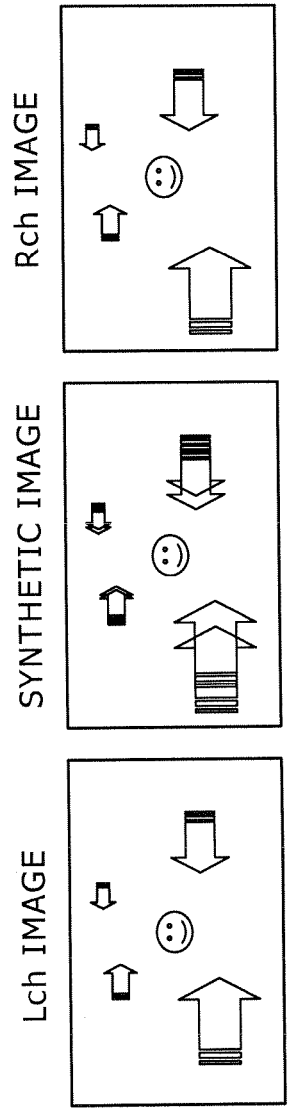
Figure 8A:
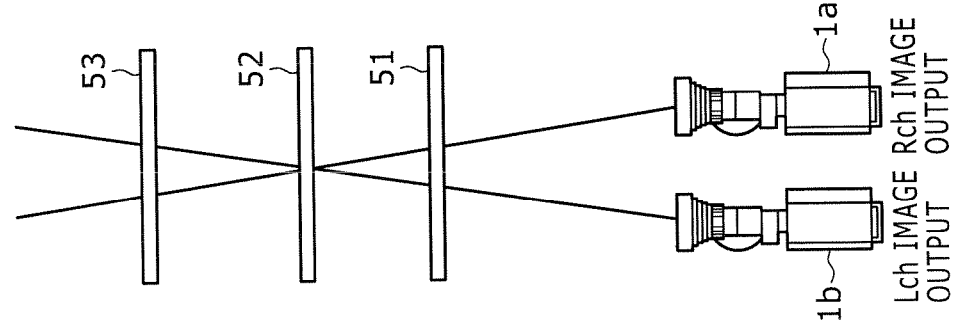

FIGS. 8A, 8B and 8C respectively show examples of the shift between the optical axes.

FIG. 8A shows an example of a situation in which the camera heads 1a and 1b capture images of the subjects 51 to 53.

It is shown that the camera heads 1a and 1b disposed with the Rig 8 being disregarded are given parallaxes, respectively, and are different in optical axis from each other. Here, predetermined marks and figures are drawn on the subjects 51 to 53. Also, the subjects 51 to 53 are different in installation position from one another with respect to each of the camera heads 1a and 1b.

FIG. 8B shows an example of display of images when there is the shift between the optical axes.

The camera heads 1a and 1b are shifted from each other not only in the horizontal direction, but also in the vertical direction. For this reason, in a synthetic image, two images are shifted from each other not only in the horizontal direction, but also in the vertical direction. Thus, the synthetic image has difficulty seeing as a 3D image.

FIG. 8C shows an example of display of images when there is no shift between the optical axes.

A right-hand side channel image captured by using the camera head 1a, and a left-hand side channel image captured by using the camera head 1b are slightly shifted from each other in the horizontal direction because the camera heads 1a and 1b are different in parallax from each other. Also, it is understood that when the right-hand side channel image and the left-hand side channel image are synthesized, the shift between the images of the mark drawn on the subject 52 in which the optical axes intersect with each other is removed, and the shift between the images of mark drawn on the subject 51 on a short distance side becomes larger than that between the images of the mark drawn on the subject 53 on a long-distance side. In this case, it is possible to output the image suitable as the 3D image. The correction for the shift between the optical axes, for example, is carried out by moving the left-hand side channel so as to correspond to the fixed right-hand side channel image while the engineer sees the synthetic image.

FIG. 9 shows an example of the filtering processing for correcting the shift between the optical axes of the images by the horizontal filter 26 with which the video processor 13, 22 is provided.

The horizontal filter 26 executes the horizontal filtering processing for the video signals inputted at equal intervals so as to correspond to the disposition of the image capturing pixels of the sensor portion 11, thereby changing the phase of the video signal in each of the pixels. By executing the horizontal filtering processing, the video signals which are outputted from the pixels disposed in the horizontal direction are converted into video signals in the pixel positions which are different in phase from one another. For this reason, the engineer can carry out the fine image adjustment in which each of distances in the vertical direction and in the horizontal direction by which the image is moved is set as a length shorter than the unit pixel.

FIGS. 10A to 10C, and FIGS. 11A to 11C respectively show examples of the image displayed on the viewfinder portion 6.

The camera adaptor box 2 can select suitable one from the output image from the camera head 1a, the output image from the camera head 1b, a mixed image of the output images from the camera heads 1a and 1b, a difference image between the output images from the camera heads 1a and 1b, and the like as a viewfinder signal, thereby displaying the image thus selected on the viewfinder portion 6.

Also, the engineer can select suitable one from manipulating a menu interface displayed on the viewfinder portion 6, carrying out the selection by using a rotary switch mounted to the camera adaptor box 2, carrying out the selection based on allocation to a push switch, or carrying out the sending in order by using the push switch, thereby selecting the image to be displayed on the viewfinder portion 6. In addition, the image to be displayed on the viewfinder portion 6 can be switched over to a return signal in accordance with a request received from a camera control unit (not shown) (refer to FIG. 13) or the like, thereby outputting the return signal. Moreover, if the viewfinder portion 6 can display thereon the three-dimensional image, the images for two channels which are outputted from the right-hand and left-hand side channels can also be displayed, and a selection menu for the images for the two channels can also be added.

Figure 10A:
FIGS. 10A, 10B and 10C are respectively explanatory views showing examples of display of images each displayed on an viewfinder in the first embodiment of the present invention.

FIG. 10A shows an example of a right-hand side channel image outputted from the camera head 1a.

Figure 10B:

FIG. 10B shows an example of a left-hand side channel image outputted from the camera head 1b.

It is shown that since the camera heads 1a and 1b are disposed in the Rig 8 so as to correspond to the parallax of a user, a shift is horizontally generated between the right-hand side image and the left-hand side image.

Figure 10C:
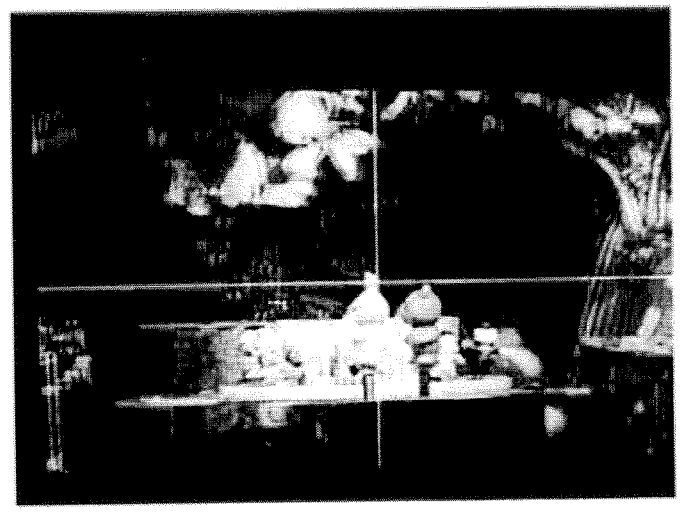

FIG. 10C shows an example of a mixed image which is displayed by mixedly displaying the images outputted from the camera heads 1a and 1b, respectively.

The mixed image is obtained by adding a luminance signal and a color difference signal (Lch_Y, Lch_CB, Lch_CR) from the camera head 1b (left-hand side channel), and a luminance signal and a color difference signal (Rch_Y, Rch_CB, Rch_CR) from the camera head 1b (right-hand side channel) to each other. Colors are given to the mixed image.

Figure 11A:
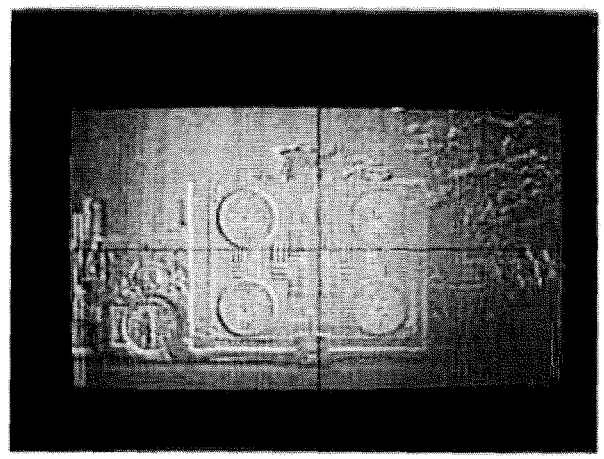
FIGS. 11A, 11B and 11C are respectively explanatory views showing examples of display of images each displayed on an viewfinder in the first embodiment of the present invention.

FIG. 11A shows an example of a difference image.

The difference image is a gray image which is obtained by subtracting the video signal outputted from the camera head 1a from the video signal outputted from the camera head 1b.

The difference image when a video chart is captured is displayed in FIG. 11A. At this time, the viewfinder portion 6 displays thereon the difference image in accordance with a difference between the luminance signal or the color difference signal of the image captured by using the camera head 1a and the luminance signal or the color difference signal of the image captured by using the camera head 1b.

The difference image is obtained by subtracting a luminance signal (Rch_Video) from the camera head 1a (right-hand side channel) from a luminance signal (Lch_Video) from the camera head 1b (left-hand side channel). It is noted that the difference image may also be obtained by subtracting the luminance signal from the camera head 1b (left-hand side channel) from the luminance signal from the camera head 1a (right-hand side channel). After that, a difference value is divided by either "2" or a suitable numeric character to obtain an offset, and an image level (50_Video-Level) having a suitable value is added thereto.

The above contents are expressed in the form of Expression (1) as follows:

$$(Lch\_Video - Rch\_Video)/2 + 50\_Video\_Level \qquad (1)$$

As a result, the difference image in which attention is paid only to the luminance can be displayed on the viewfinder portion 6.

Likewise, the difference data can also be created in accordance with the color difference data. At this time, the difference is obtained by subtracting a color difference signal (Rch_CB, Rch_CR) from the camera head 1a (right-hand side channel) from a color difference signal (Lch_CB, Lch_CR) from the camera head 1b (left-hand side channel).

This relationship is expressed by Expression (2) as follows:

$$(Lch\_CB - Rch\_CB)/2 \text{ or } (Lch\_CR - Rch\_CB)/2 \qquad (2)$$

However, since in the case of the color difference data, a zero point is an intermediate point, it is unnecessary to add the offset value. In addition, in order to carry out the intensified display, the difference between the color difference from the camera head 1a and the color difference from the camera head 1b is not divided by "2," but may be multiplied by a suitable number, thereby carrying out the intensification. From the above, any of a monochrome mode in which only the luminance is displayed as the difference image, and a color mode in which the color difference data is added can be displayed on the viewfinder portion 6.

When the camera heads 1a and 1b are properly disposed in zoom and direction, since no shift is generated between the images, the identical state is provided in which no outline is displayed in the difference image. However, when the dispositions of the camera heads 1a and 1b are different from proper ones, respectively, a shift is generated between two sheets of images. As a result, as shown in a left-hand side of FIG. 11A, an outline of the subject is emphatically displayed. For this reason, this becomes effective information when the camera heads 1a and 1b installed in the Rig 8 are properly set in zoom and direction.

Figure 11B:

FIG. 11B shows an example of an anaglyph image.

The anaglyph image is an image which has been traditionally used in order to see the three-dimensional image. For example, the user wears dedicated eyeglasses in which a red cellophane is stuck to a left-hand side eyeglass, and a blue cellophane is stuck to a right-hand side eyeglass, thereby making it possible to confirm the three-dimensional image.

Figure 11C:
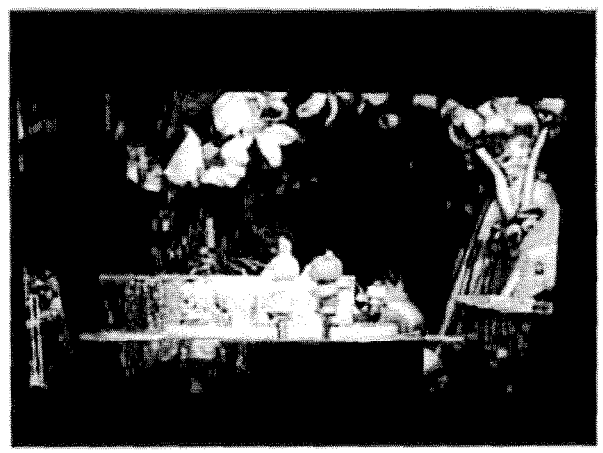

FIG. 11C shows an example of a segmented image.

In this case, a right-hand side half of an image outputted from the camera head 1a, and a left-hand side half of an image outputted from the camera head 1b are prepared in a the segmentation state, and these segmented images are tied at the center together for display. As a result, the engineer grasps the distortions or the like of the installation positions of the camera heads 1a and 1b, and thus readily adjusts the horizontal distortions of the camera heads 1a and 1b. It is noted that although not illustrated, an upper-hand side half of an image outputted from the camera head 1a, and a lower-hand side half of an image outputted from the camera head 1b may be prepared in a segmentation state, and these segmented images may be tied at the center together for display. In this case, it becomes easy to adjust the vertical distortions of the camera heads 1a and 1b.

According to the 3D camera system 10 of the first embodiment described above, in the 3D image capturing by using the two cameras, the camera heads 1a and 1b are used each of which executes the camera signal processing for all the pixels by using the sensor portion 11 in which the effective image region of the image pickup element is made wider than the signal format. At this time, the video processor 13 and 22 receive the video signals from the camera head 1a and 1b each of which outputs both the standard video signal and the enlarged region video signal from the image pickup element including the effective image and the enlarged region. At this time, the enlarged region video signal is superimposed on each of the vertical blanking interval and the horizontal blanking interval, and in this state is then transmitted. Also, the video processor 13, 22 outputs both the standard video signal and the enlarged region video signal to the viewfinder portion 6 and causes the viewfinder portion 6 to display thereon the image. At this time, the engineer manipulates the control panel 7 while he/she sees the image displayed on the viewfinder portion 6, thereby instructing either the camera head 1a, 1b or the camera adaptor box 2 to adjust the shift between the optical axes. In accordance with this instruction, the horizontal/vertical filter 15, 25 with which the video processor 13, 22 is provided moves the region of the standard video signal so as to correspond to the shift between the optical axes within the range of the enlarged region video signal. Also, the horizontal/vertical filter 15, 25 extracts the standard video signal corresponding to the movement amount from the enlarged region video signal contained in the range of the movement amount, and outputs the standard video signal thus extracted, thereby causing either the camera head 1a, 1b or the camera adaptor box 2 to compound the images.

For this reason, the effective image region and the enlarged region are switched over to each other, thereby making it possible to correct an error amount, of the optical paths of the lenses, which is caused between the camera heads 1a and 1b. In such a manner, even when the engineer does not adjust the height of the Rig 8 in which the camera heads 1a and 1b are installed, the directions of the camera heads 1a and 1b, and the like, he/she can correct the shift between the optical axes while he/she sees the image displayed on the viewfinder portion 6. As a result, since the 3D camera system 10 has the function of correcting the shift between the optical axes by using the video signal stored in the enlarged region, thereby cutting out the region for which the shift between the optical axes is corrected, it becomes possible to reduce the cost and the labor.

In addition, the video processor 22 embeds the image capturing condition information in which the status information such as the zoom of the lens (not shown) with which the camera head 1a, 1b is provided. Also, since the video processor 22 carries out image output corresponding to the image capturing condition information, reg. center correction for two sheets of images can be carried out so as to correspond to the image capturing condition information (such as the state of lens).

In addition, the instruction to compound the images by the control panel 7 can be made along the vertical direction, the horizontal direction or the rotational direction with respect to the effective image region displayed on the viewfinder portion 6. At this time, the horizontal/vertical filter 15, 25 cuts out the enlarged region video signal contained in the instructed direction, thereby extracting the enlarged region video signal as the standard video signal. For this reason, there is obtained an effect such that the engineer can compound the images at an arbitrary distance within the range of the enlarged region, and thus the degree of freedom of the reg. center correction is enhanced.

In addition, the horizontal/vertical filter 15, 25 executes the filtering processing both in the vertical direction and in the horizontal direction of the effective image region. Thus, each of the distances of the movements both in the vertical direction and in the horizontal direction of the standard video signal can be made the length shorter than the unit pixel in the image pickup element. For this reason, the precision of the reg. center correction is enhanced, and thus it is possible to obtain the 3D image having the enhanced quality which does not provide a feeling of strangeness for the user.

2. Second Embodiment

Figure 12:
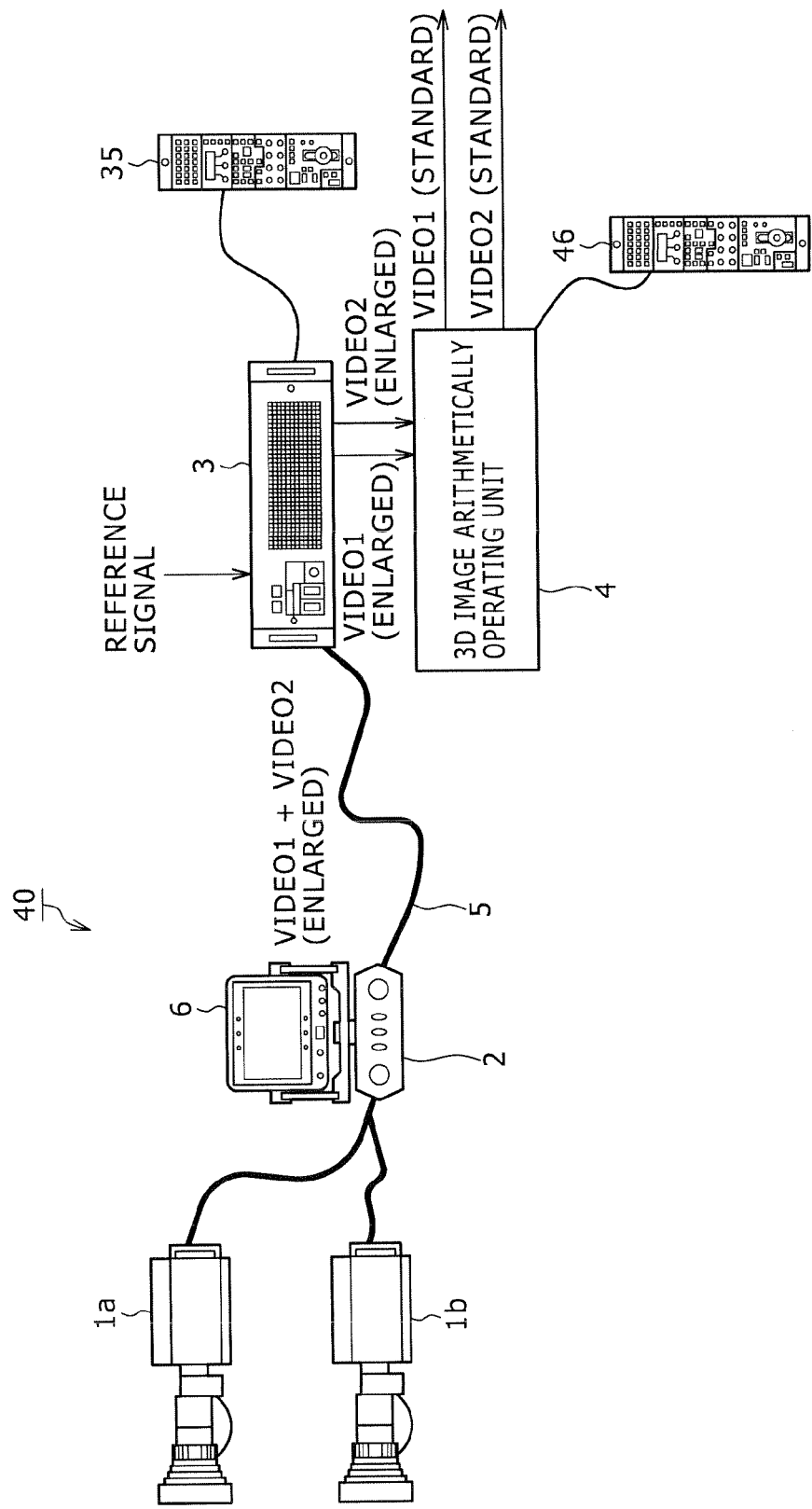
FIG. 12 is a schematic view showing an external configuration of a camera system according to a second embodiment of the present invention.

Next, a second embodiment of the present invention will be described with reference to FIGS. 12 and 13. In the second embodiment, a description is given with respect to the case where the present invention is applied to a 3D camera system 40.

In the following description, portions which have been described in the first embodiment are designated by the same reference numerals, respectively, and a detailed description thereof is omitted here for the sake of simplicity.

The 3D camera system 40 includes the camera heads 1a and 1b, the camera adaptor box 2, a Camera Control Unit (CCU) 3, and a 3D image arithmetically operating unit 4. In this case, the camera control unit 3 carries out the alignment between the optical axes of two sheets of images. The camera control unit 3 is connected to the camera adaptor box 2 through the camera cable 5, and the 3D image arithmetically operating unit 4 is connected to the camera control unit 3.

The camera cable 5 is used as a communication interface having a broadband (which is twice or more as wider as the existing band) between the camera adaptor box 2 and the camera control unit 3. Thus, the data on the image outputted from the camera heads 1a and 1b, respectively, can be simultaneously transmitted in a state of containing the standard video signal and the enlarged region video signal. In addition, the camera control unit 3, for example, includes a communication interface responding to 3G-HDI, and can transfer the video signal to the 3D image arithmetically operating unit 4 at a high speed through the communication interface. The camera control unit 3 outputs a control signal inputted thereto from the manipulation portion 35 to the camera adaptor box 2, thereby controlling the operations of the camera heads 1a and 1b. Also, the camera control unit 3 outputs the video signal received from the camera adaptor box 2 to a display device (not shown). Likewise, an operation of the 3D image arithmetically operating unit 4 is controlled by a manipulation portion 46 manipulated by the engineer. The operation of the 3D image arithmetically operating unit 4 includes the reg.

center correction processing for correcting the shift between the optical axes of two sheets of images as described above, for example.

Also, the camera adaptor box 2 is provided between each of the camera heads 1a and 1b, and the camera control unit 3. Therefore, the camera adaptor box 2 appears that the operation of one camera is controlled for the camera adaptor box 2.

The two sheets of images the data on which is received from the camera adaptor box 2 are displayed on a monitor portion (not shown) connected either to the camera control unit 3 or to the 3D image arithmetically operating unit 4. For this reason, the engineer can confirm the images while he/she sees the monitor portion, and compounds the images while he/she sees the images displayed on the monitor portion by manipulating the manipulation portions 35 and 46.

Figure 13:
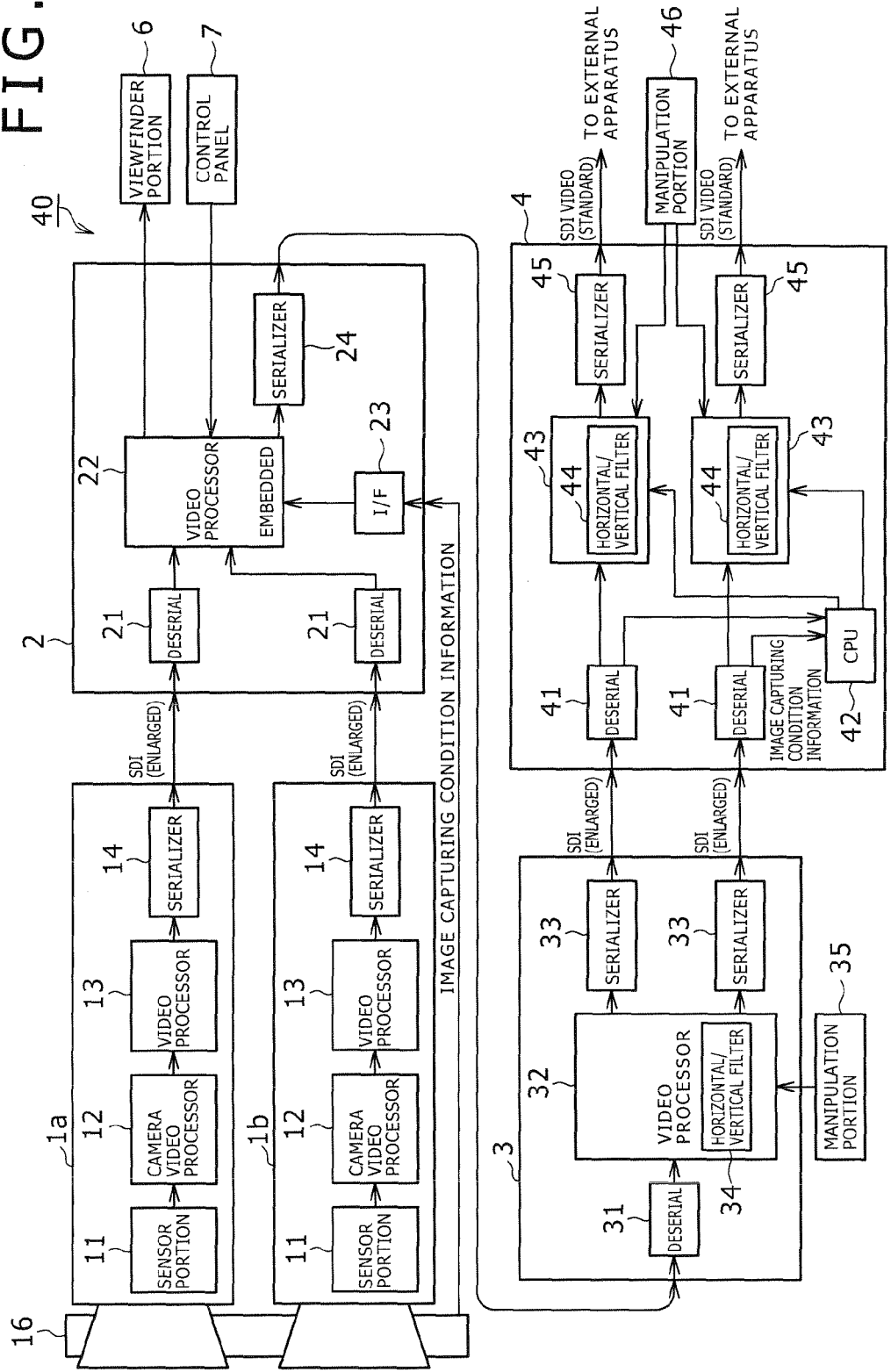
FIG. 13 is a schematic view showing an internal configuration of the camera system according to the second embodiment of the present invention.

FIG. 13 is a block diagram supposing an application when the 3D image is captured.

In the 3D camera system 40, the camera control unit 3 and the 3D image arithmetically operating unit 4 correspond to the enlarged transmission system according to the embodiments of the present invention for adjusting the shift between the optical axes by using both the standard video signal and the enlarged region video signal. At this time, the camera adaptor box 2 instructs each of the camera heads 1a and 1b to carry out the image capturing operation, while the camera adaptor box 2 passes therethrough both the standard video signal and the enlarged region video signal to output both the standard video signal and the enlarged region video signal to the subsequent camera control unit 3.

The camera control unit 3 includes a deserial 31, a video processor 32, and a serializer 33. In this case, the deserial 31 converts a serial video signal inputted thereto from the camera adaptor box 2 into a parallel video signal. The video processor 32 subjects the parallel video signal inputted thereto from the deserial 31 to predetermined processing. Also, the serializer 33 converts the parallel video signal after completion of the predetermined processing into a serial video signal, thereby outputting the resulting serial video signal. The video signal which is superimposed on the enlarged region is transmitted between the camera control unit 3 and the 3D image arithmetically operating unit 4 in accordance with the SDI transmission format. In addition, the camera control unit 3 includes the manipulation portion 35 connected to the video processor 32. The manipulation portion 35 outputs a manipulation signal in accordance with which the shift between the optical axes of the images captured by using the camera heads 1a and 1b is adjusted based on the image displayed on the display portion in accordance with the standard video signal. Thus, the engineer can compound the images displayed on a monitor portion (not shown) by manipulating the manipulation portion 35.

The 3D image arithmetically operating unit 4 includes a deserial 41 and a CPU 42. In this case, the deserial 41 converts the serial video signal inputted thereto from the camera control unit 3 into a parallel video signal. Also, the CPU 42 executes predetermined arithmetically operating processing in accordance with a lens status inputted thereto together with the serial video signal from the camera control unit 3. In addition, the 3D image arithmetically operating unit 4 includes a video processor 43 and a serializer 45. In this case, the video processor 43 compounds the images. Also, the serializer 45 converts a parallel image signal of the images thus compounded into a serial video signal, and outputs the resulting serial video signal. The serializer 45 superimposes the serial video signal on the standard region in accordance with the SDI transmission format, and outputs the resulting serial video signal. In addition, the 3D image arithmetically operating unit 4 includes the manipulation portion 46 connected to the video processor 43. Thus, the engineer can compound the images displayed on the monitor portion (not shown) by manipulating the manipulation portion 46.

Here, when the horizontal/vertical filter 34 of the video processor 32 with which the camera control unit 3 is provided adjusts the shift between the optical axes, the horizontal/vertical filter 44 with which the video processor 43 is provided is bypassed. On the other hand, when the horizontal/vertical filter 44 with which the video processor 43 is provided adjusts the shift between the optical axes, the horizontal/vertical filter 34 of the video processor 32 with which the camera control unit 3 is provided is bypassed, and thus both the camera video signal and the enlarged region video signal pass through the camera control unit 3. In such a manner, the horizontal/vertical filters 34 and 44 have a relationship such that when one of the horizontal/vertical filters 34 and 44 carries out the filtering operation, the other bypasses the processing. An example of the filtering operation which is carried out by the horizontal/vertical filter 34, 44 is the same as that of the processing which is executed by the horizontal/vertical filter 15, 25 in the first embodiment described above. That is to say, the horizontal/vertical filter 34, 44 functions as the video signal extracting portion which, when the shift between the optical axes is adjusted in accordance with the manipulation signal, moves the region of the standard video signal so as to correspond to the shift between the optical axes within the range of the enlarged region video signal, extracts the standard video signal corresponding to the movement amount from the enlarged region video signal contained in the range of the movement amount, and outputs the standard video signal thus extracted.

According to the 3D camera system 40 of the second embodiment of the present invention described above, when the system operation is carried out by using a plurality of camera heads 1a and 1b, or when a distance between the camera and the control panel or the apparatus for receiving the video signal is desired to be lengthened to a long distance, the 3D camera system 40 can have the system configuration including the camera control unit 3 and the 3D image arithmetically operating unit 4. Here, the camera control unit 3 and the 3D image arithmetically operating unit 4 correct the shift between the optical axes of the two sheets of images in accordance with the instructions issued from the manipulation portions 35 and 46 by using both the standard video signal and the enlarged region video signal which are superimposed on the enlarged region of the transmission format and are received from the camera heads 1a and 1b, thereby compounding the two sheets of images. For this reason, it is possible to reduce the number of wirings wired to the camera side (the camera heads 1a and 1b, and the camera adaptor box 2). Thus, it is possible to more flexibly carry out the operation in the cooperation image capturing by using a plurality of cameras such as live system cameras. This makes the system camera configuration similar to the existing 2D image capturing possible even in the 3D camera system.

In addition, the camera heads 1a and 1b, the camera adaptor box 2, the camera control unit 3, and the 3D image arithmetically operating unit 4 are connected to one another through a signal line. For example, various kinds of communication media or communication systems such as a coaxial cable, a triax cable, an optical fiber cable, and a wireless communication are used when the camera heads 1a and 1b, the camera adaptor box 2, the camera control unit 3, and the 3D image arithmetically operating unit 4 are connected to one another. For this reason, it is possible to carry out the system operation which is rich in flexibility.

3. Changes

As described above, the reg. center correction processing is realized by each of the video processors with which the respective units are provided. Here, a recording unit which can carry out recording every AUX region may be disposed between the camera control unit 3 and the 3D video arithmetically operating unit 4.

Figure 14:
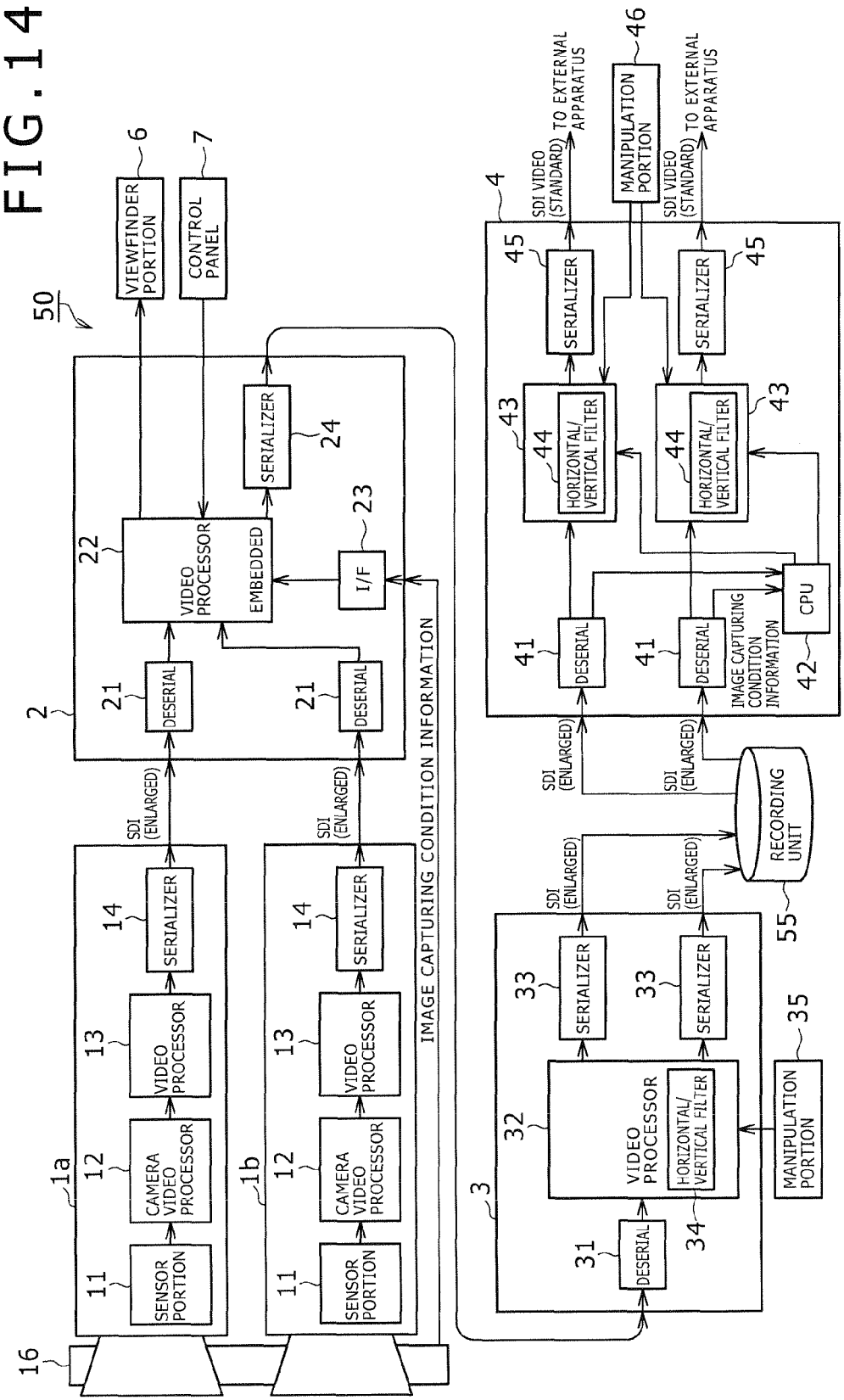
FIG. 14 is a schematic view showing an internal configuration of a camera system according to a third embodiment of the present invention.

FIG. 14 shows an example of a configuration of a 3D camera system 50 including a large-capacity recording unit 55 between the camera control unit 3 and the 3D video arithmetically operating unit 4.

The recording unit 55 records both the standard video signal and the enlarged region video signal containing the enlarged region and passing through the camera control unit 3 as they are. For example, a Hard Disk Drive (HDD) is used as the recording unit 55. Also, the 3D video arithmetically operating unit 4 reads out both the standard video signal and the enlarged region video signal from the recording unit 55, and outputs both the standard video signal and the enlarged region video signal to the monitor portion. In such a manner, the 3D video arithmetically operating unit 4 can read out the video signal containing therein the enlarged region from the recording unit 55. As a result, the 3D video arithmetically operating unit 4 can execute post-processing for the reg. correction by using the video signal read out from the recording unit 55. In this case, the processing for the reg. correction has not to be made to correspond to the timing at which the camera head 1a, 1b captures the image of the subject. Thus, this case is suitable for capturing and editing an image of a subject for which the real time property is not required.

In addition, the camera head 1a, 1b may be used in the form of a single body. In this case, the camera head 1a, 1b used in the form of the single body can be utilized as the 3D camera system which can transmit the wide image region. At this time, the enlarged region video signal may be used in a tab for sticking or the like for the filtering processing in the phase of correction of the shift between the optical axes of the lenses, and conversion of the number of pixels.

In addition, a series of processing in each of the first and second embodiments described above can be executed by the software as well as by the hardware. When a series of processing is executed by the software, a series of processing can be executed either by a computer in which a program composing the software concerned is incorporated in the dedicated hardware, or by a computer in which a program for executing various kinds of functions is installed. For example, a program composing a desired program may be installed in a general-purpose personal computer or the like in order to execute a series of processing.

In addition, a recording media in which a program code of the software for realizing each of the functions of the first and second embodiments described above is recorded may be supplied either to a system or to an apparatus. In addition, it goes without saying that the computer (or the control unit such as a CPU) of the system or the apparatus also reads out and executes the program code stored in the recording media, thereby realizing the function.

A flexible disk, a hard disk, an optical disk, a magneto optical disk, a CD-ROM, a CD-R, a magnetic tape, a non-volatile memory card, a ROM or the like, for example, can be used as the recording media for supplying the program code in this case.

In addition, the program code read out by the computer is executed, thereby realizing each of the functions of the first and second embodiments described above. In addition thereto, an OS or the like operating on the computer executes either a part of or all of the actual processing in accordance with the instruction of the program code. The case where each of the functions of the first and second embodiments described above is realized through the processing concerned is also contained herein.

4. Third Embodiment

A video signal processing method according to a third embodiment of the present invention includes the steps of: outputting the standard video signal and the enlarged region video signal to the display portion for displaying thereon the image when camera heads 1a and 1b each having the image pickup element including the effective image region for output of the standard video signal, and the enlarged region wider in horizontal and vertical directions than the effective image region, outputting the standard image signal from the effective image region, and outputting the enlarged region video signal from the enlarged region transmits the standard video signal in accordance with the predetermined transmission format with which the standard video signal and the enlarged region video signal are transmitted, and superimposes the enlarged region video signal on each of the vertical blanking interval and the horizontal blanking interval of the predetermined transmission format, thereby transmitting the resulting enlarged region video signal; outputting the manipulation signal in accordance with which the shift between the optical axes of the images captured by using the camera heads 1a and 1b, respectively, is adjusted based on the image displayed on the display portion in accordance with the standard video signal; and moving the region of the standard video signal so as to correspond to the shift between the optical axes within the range of the enlarged region video signal when the shift between the optical axes is adjusted in accordance with the manipulation signal, extracting the standard video signal corresponding to the movement amount from the enlarged region video signal contained in the range of the movement, and outputting the standard video signal thus extracted.

It is noted that the video signal processing apparatus of the embodiments of the present invention virtually incorporated in the 3D camera system is embodied as described in the first and second embodiments or changes thereof of the 3D camera system.

In addition, it is to be understood that the present invention is by no means limited to the embodiments described above, and various application examples and changes can be made without departing from the subject matter of the present invention.

The present application contains subject matter related to that disclosed in Japanese Priority Patent Application JP 2009-297929 filed in the Japan Patent Office on Dec. 28, 2009, the entire content of which is hereby incorporated by reference.

It should be understood by those skilled in the art that various modifications, combinations, sub-combinations and alterations may occur depending on design requirements and other factor in so far as they are within the scope of the appended claims or the equivalents thereof.

What is claimed is:

1. A video signal processing apparatus, comprising:
    an image outputting portion for outputting a standard video signal and an enlarged region video signal to a display portion for displaying thereon an image when first and second cameras each having an image pickup element including an effective image region for output of the standard video signal, and an enlarged region wider in horizontal and vertical directions than the effective image region, outputting the standard image signal from the effective image region, and outputting the enlarged region video signal from the enlarged region transmits the standard video signal in accordance with a predetermined transmission format with which the standard video signal and the enlarged region video signal are transmitted, and superimposes the enlarged region video signal on each of a vertical blanking interval and a horizontal blanking interval of the predetermined transmission format, thereby transmitting the resulting enlarged region video signal;

a manipulation portion for outputting a manipulation signal in accordance with which a shift between optical axes of images captured by using said first and second cameras, respectively, is adjusted based on the image displayed on said display portion in accordance with the standard video signal; and a video signal extracting portion for moving a region of the standard video signal so as to correspond to the shift between the optical axes within a range of the enlarged region video signal when the shift between the optical axes is adjusted in accordance with the manipulation signal, extracting the standard video signal corresponding to a movement from the enlarged region video signal contained in a range of the movement, and outputting the standard video signal thus extracted.

2. The video signal processing apparatus according to claim 1, wherein said first and second cameras send image capturing condition information set in said first and second cameras to said video signal extracting portion when an image of a subject is captured; and said video signal extracting portion extracts the standard video signal so as to correspond to the shift between the optical axes of said first and second cameras in accordance with the image capturing condition information.

3. The video signal processing apparatus according to claim 1, wherein said video signal extracting portion cuts out the enlarged region video signal contained in any one of a vertical direction, a horizontal direction or a rotational direction with respect to the effective image region, thereby extracting the standard video signal.

4. The video signal processing apparatus according to claim 1, wherein said video signal extracting portion executes filtering processing both in a vertical direction and in a horizontal direction of the effective image region, and each of distances of movements of the standard video signal both in the vertical direction and in the horizontal direction is set as a length shorter than a unit pixel in said image pickup element.

5. A video signal processing method, comprising the steps of:

outputting a standard video signal and an enlarged region video signal to a display portion for displaying thereon an image when first and second cameras each having an image pickup element including an effective image region for output of the standard video signal, and an enlarged region wider in horizontal and vertical directions than the effective image region, outputting the standard image signal from the effective image region, and outputting the enlarged region video signal from the enlarged region transmits the standard video signal in accordance with a predetermined transmission format with which the standard video signal and the enlarged region video signal are transmitted, and superimposes the enlarged region video signal on each of a vertical blanking interval and a horizontal blanking interval of the predetermined transmission format, thereby transmitting the resulting enlarged region video signal;

outputting a manipulation signal in accordance with which a shift between optical axes of images captured by using said first and second cameras, respectively, is adjusted based on the image displayed on said display portion in accordance with the standard video signal; and moving a region of the standard video signal so as to correspond to the shift between the optical axes within a range of the enlarged region video signal when the shift between the optical axes is adjusted in accordance with the manipulation signal, extracting the standard video signal corresponding to a movement from the enlarged region video signal contained in a range of the movement, and outputting the standard video signal thus extracted.

6. A video signal processing apparatus, comprising:

image outputting means for outputting a standard video signal and an enlarged region video signal to a display portion for displaying thereon an image when first and second cameras each having an image pickup element including an effective image region for output of the standard video signal, and an enlarged region wider in horizontal and vertical directions than the effective image region, outputting the standard image signal from the effective image region, and outputting the enlarged region video signal from the enlarged region transmits the standard video signal in accordance with a predetermined transmission format with which the standard video signal and the enlarged region video signal are transmitted, and superimposes the enlarged region video signal on each of a vertical blanking interval and a horizontal blanking interval of the predetermined transmission format, thereby transmitting the resulting enlarged region video signal;

manipulation means for outputting a manipulation signal in accordance with which a shift between optical axes of images captured by using said first and second cameras, respectively, is adjusted based on the image displayed on said display portion in accordance with the standard video signal; and video signal extracting means for moving a region of the standard video signal so as to correspond to the shift between the optical axes within a range of the enlarged region video signal when the shift between the optical axes is adjusted in accordance with the manipulation signal, extracting the standard video signal corresponding to a movement from the enlarged region video signal contained in a range of the movement, and outputting the standard video signal thus extracted.

\* \* \* \* \*